United States Patent [19]
Gehring et al.

[11] Patent Number: 5,134,724
[45] Date of Patent: Jul. 28, 1992

[54] WRIST BAND FOR WRIST-MOUNTED RADIO WITH AN UNINSULATED BUCKLE

[75] Inventors: Mark R. Gehring, Portland; Richard R. Suter, Beaverton, both of Oreg.; Lawrence H. Ragan, Richardson, Tex.

[73] Assignees: Seiko Corp.; Seiko Epson Corp., both of Japan

[21] Appl. No.: 520,650

[22] Filed: May 8, 1990

[51] Int. Cl.⁵ .......................... H04B 1/06; H04B 1/18; H01Q 1/12

[52] U.S. Cl. .................... 455/274; 455/280; 455/344; 455/348; 455/351; 343/718; 343/720; 343/788; 340/825.44

[58] Field of Search ................ 455/193, 274, 260–281, 455/290, 344, 351, 348, 349; 343/718, 720, 788; 368/10; 340/825.44

[56] References Cited

U.S. PATENT DOCUMENTS

| | | | |
|---|---|---|---|
| 2,255,897 | 9/1941 | Rebori et al. | 343/718 |
| 3,032,651 | 5/1962 | Gisiger-Stähli et al. | 455/351 |
| 4,754,285 | 6/1988 | Robitaille | 343/718 |
| 4,769,656 | 9/1988 | Dickey | 455/351 |
| 4,817,196 | 3/1989 | Macnak et al. | 343/718 |
| 4,862,516 | 8/1989 | Macnak et al. | 343/718 |
| 4,873,527 | 10/1989 | Tan | 343/718 |
| 4,884,252 | 11/1989 | Teodoridis et al. | 455/344 |
| 4,885,802 | 12/1989 | Ragan | 455/344 |
| 4,922,260 | 5/1990 | Gaskill et al. | 455/351 |
| 4,977,614 | 12/1990 | Kurcbart | 455/274 |
| 5,007,105 | 4/1991 | Kudoh et al. | 455/344 |

FOREIGN PATENT DOCUMENTS 0053232  3/1983  Japan ........................ 455/351

*Primary Examiner*—Curtis Kuntz
*Assistant Examiner*—Andrew Faile
*Attorney, Agent, or Firm*—Elmer Galbi

[57] ABSTRACT

A wrist band for a wrist-mounted radio system is provided wherein a metallic wrist-band buckle need not be insulated. The system includes a radio receiver which includes a differential input in a wrist-band antenna with a "null point" at the location of the buckle. The wrist-band antenna is insulated from the wearer's body at all points except at the buckle.

18 Claims, 3 Drawing Sheets

WRIST BAND FOR WRIST-MOUNTED RADIO WITH AN UNINSULATED BUCKLE

FIELD OF THE INVENTION

The present invention relates to a wrist-mounted radio receiver, and more particularly to a wrist band and buckle for such a radio receiver.

BACKGROUND OF THE INVENTION

A number of wrist-mounted radio receivers are known. Such devices are generally combined with a wristwatch and generally provide some type of paging capability. A wrist band, which secures the radio receiver to a wearer's wrist, is generally used to contain an antenna for such a radio receiver. One such receiver is disclosed in U.S. Pat. No. 4,713,808, WATCH PAGER SYSTEM AND COMMUNICATION PROTOCOL, Gaskill et al., Dec. 15, 1987. Another receiver is discussed in U.S. Pat. No. 4,873,527, ANTENNA SYSTEM FOR A WRIST CARRIED PAGING RECEIVER, Tan, Oct. 10, 1989. A radio receiver which is designed for such an application is disclosed in U.S. Pat. No. 4,885,802, WRISTWATCH RECEIVER ARCHITECTURE, Ragan, Dec. 5, 1989. Differential inputs to amplifiers are known, and one such differential input amplifier is disclosed in Signetics Linear Products Corporation specification sheet for Model No. TDA 1574 FM Front-End Integrated Circuit, Nov. 14, 1986. Additionally, a co-pending application entitled AUTOMATIC ANTENNA TUNING METHOD AND APPARATUS, Ser. No. 07/279,952, filed Dec. 5, 1988, discloses amplifiers having differential inputs, having a side thereof grounded. The preceding patents, publications and applications are incorporated herein by reference.

Generally, if a radio antenna is contacted by a conducting object, or by a body, the antenna will be detuned, i.e., the effective length of the antenna will change and the ability of the antenna to receive RF signals in its intended frequency range will be degraded. This tendency of an antenna to detune in the case of wrist-mounted radio receivers is particularly troublesome as the antenna must generally be insulated from the wearer's wrist to prevent or minimize the effect of the contact between the antenna and the wearer's body. Such problems may be overcome by completely insulating the antenna over its length. However, in the case of a watch band which includes a pair of straps ad a buckle located between and joining the two straps, the problem of insulating the buckle while still providing an electrical contact between antenna halves which are carried in the straps requires that the buckle be insulated or that some complicated mechanism be provided to connect the two halves of the antenna. Providing effective insulation for such a buckle, while simultaneously providing a buckle which connects the two straps of a wrist band, thereby providing both physical and electrical connection between the two sections of the antenna, is difficult if not impossible.

SUMMARY OF THE INVENTION

The present invention provides a wrist-mounted radio system u wherein antenna has a balanced, differential input. An unexpected result of this configuration is that the buckle of the wristband need not be insulated. The system includes a radio receiver having the balanced, differential input for a wrist-band antenna, which has a "null point" at the location of the buckle. The wrist-band antenna is insulated from the wearer's body at all points except at the buckle. Touching an antenna at a null point does not degrade the performance of the antenna, therefore, touching the buckle of the watch band has no affect on the antenna. The wearer may touch the buckle, or the buckle may come in contact with the wearer's skin, while not substantially detuning the antenna.

DETAILED DESCRIPTION OF THE PREFERRED EMBODIMENTS

Figure 1:
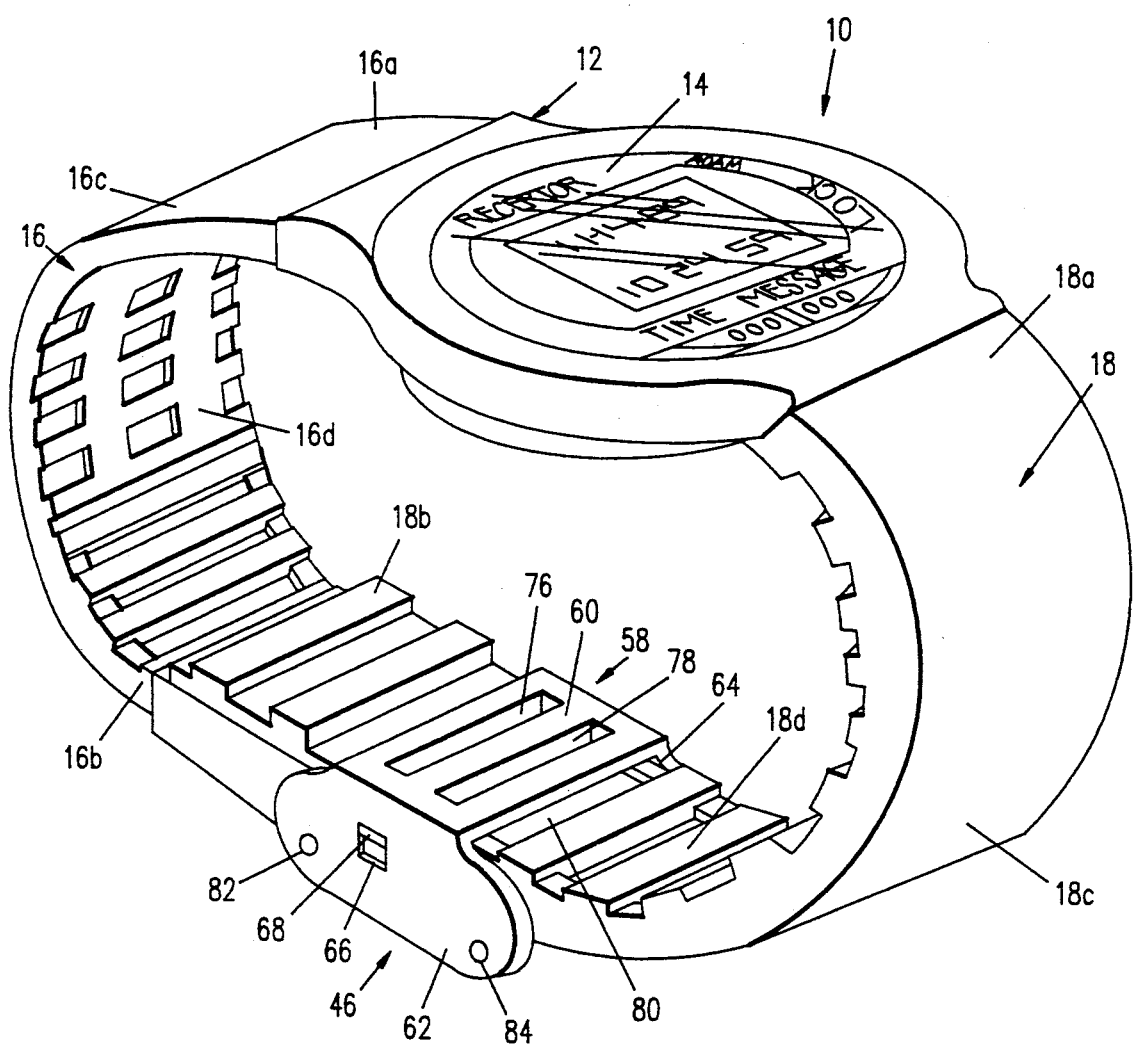
FIG. 1 is a perspective view of a wristwatch radio receiver incorporating the watch band of the invention.

Turning initially to FIG. 1, a wristwatch 10 incorporates a radio receiver system therein. Watch 10 includes a case 12 having a face 14 which displays time, date and message information. Operation and construction of the wristwatch and the radio receiver/time keeping architecture are disclosed .in U.S. Pat. No. 4,713,808, WATCH PAGER SYSTEM AND COMMUNICATION PROTOCOL, to Gaskill et al., Dec. 15, 1987, and U.S. Pat. No. 4,885,802, WRISTWATCH RECEIVER ARCHITECTURE, to Ragan, Dec. 5, 1989. Those patents are incorporated herein by reference.

Figure 2:
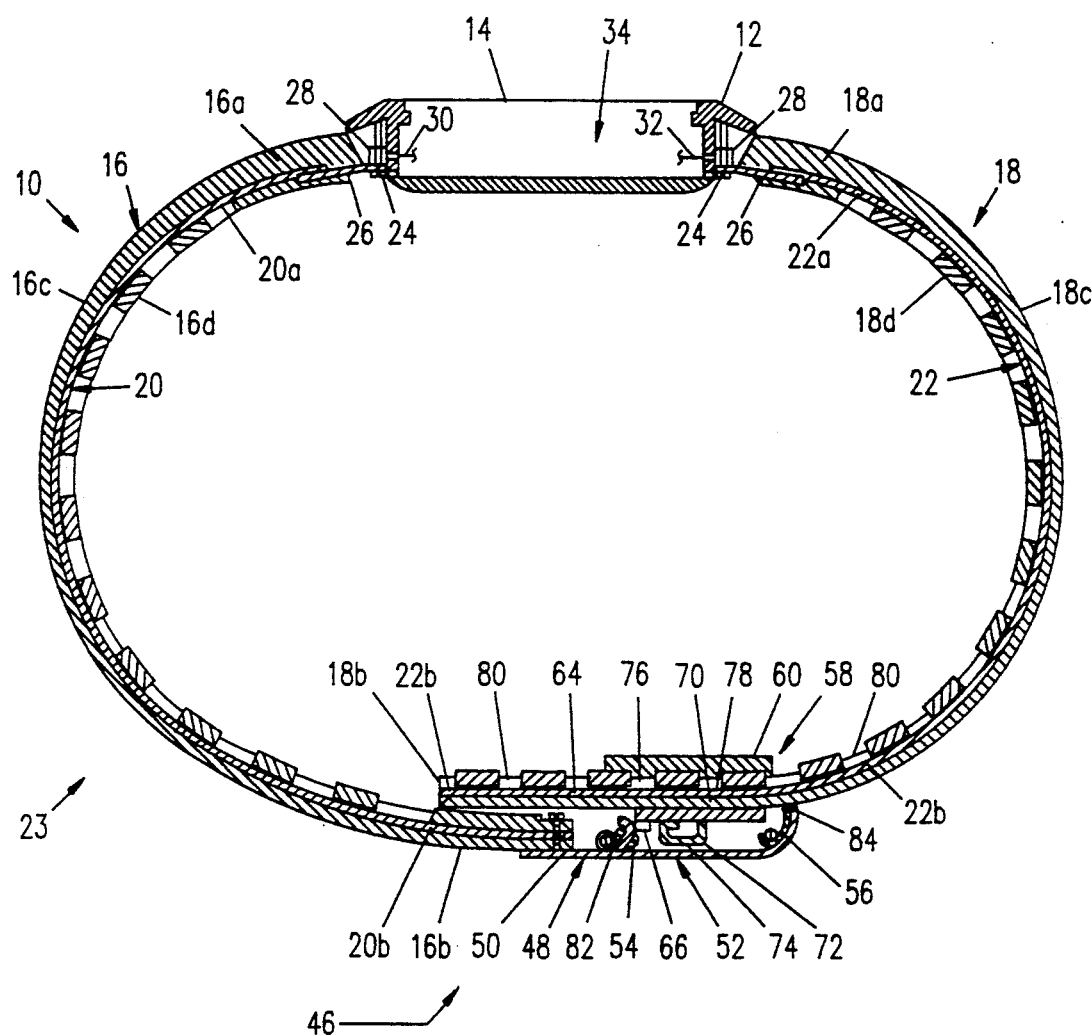
FIG. 2 is a medial section side elevation of the wristwatch radio receiver of FIG. 1.

Two wrist straps 16, 18 extend from opposite sides of case 12. Each strap has a first end, 16a, 18a, and a second end 16b, 18b. Referring now to FIGS. 1 and 2, and 2, antenna elements or sections 20, 22 are carried on the inside of wrist straps 16, 18, respectively. Each antenna element has a first end 20a, 22a, and a second end 20b, 22b, which substantially conform to the locations of the first and second ends of the wrist straps, respectively. Antenna elements 20, 22 and a buckle, to be described later herein, define a loop antenna 23.

Attachment means are provided for physically attaching the first end of each of the wrist straps to the case. In the preferred embodiment, such attachment means may take the form of a conventional, spring-loaded watch strap connecting bar (not shown) or, the strap may be secured to the case by means of a non-electrically conductive screw, such as screw 24, which passes through a tab 26, secured to both the antenna element and the strap. It should be appreciated that tabs 26 are electrically conductive and secured to the first end of each antenna element, but are not in electrical contact with case 12.

Connection means are provided for electrically connecting the first end of each antenna element to the radio receiver to form a differential input to the radio receiver. In the preferred embodiment, connection means takes the form of a block 28 located on each side of case 12. Blocks 28 provide an insulated pathway for antenna leads 30, 32 between antenna 23 and the radio receiver which is contained in case 12.

Figure 3:
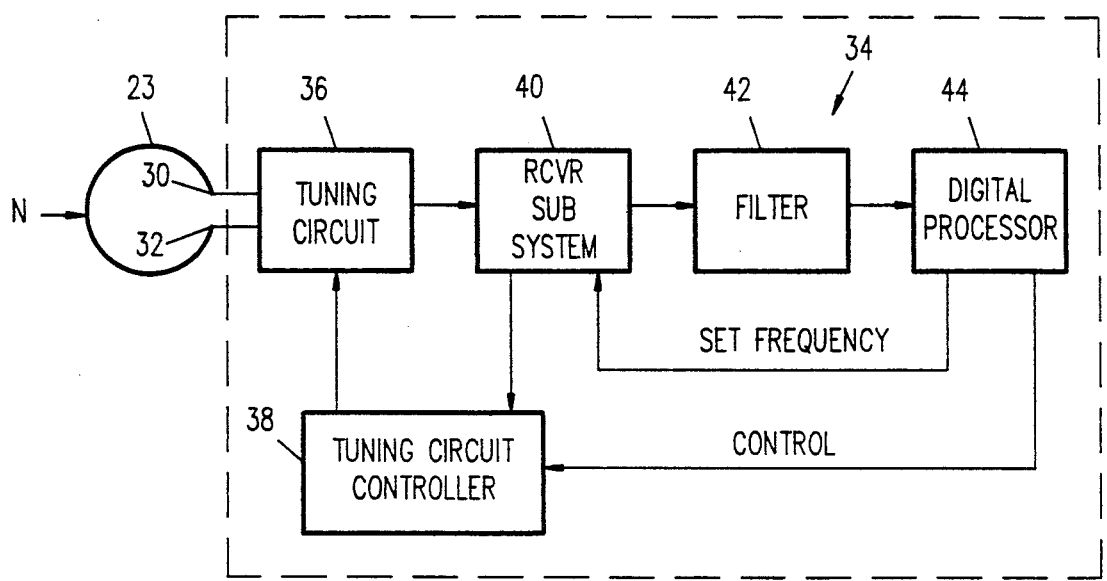
FIG. 3 is a block diagram of a radio receiver contained in the watch of FIG. 1.

Referring momentarily to FIG. 3, a radio receiver 34 is depicted connected to antenna 23. Receiver 34 is connected to antenna leads 30, 32 and includes an antenna tuning circuit 36, an antenna tuning control circuit 38, a receiver subsystem 40, a filtering section 42, and a digital control processor 44. Antenna 23 receives radio frequency signals in the desired reception band, such as in the 88-108 MHz band, and couples them, through the antenna tuning circuit 36 to the receiver subsystem 40. Antenna tuning circuit 36 resonates the antenna and matches the tuned circuit to the input impedance of the receiver subsystem, so as to provide optimum receiver noise figure and dynamic range. The antenna tuning circuit 36 is controlled by the antenna tuning control circuit 38, as described in co-pending application for ANTENNA TUNING METHOD AND APPARATUS, Ser. No. 07/279,952, Gaskill et al., filed Dec. 5, 1988, which is incorporated herein by reference. The '952 application discloses a differential amplifier which has one side thereof grounded, which, while presenting a differential amplifier, does not provide a balanced circuit, which will produce a null point at a desired location on loop antenna 23.

Figure 4:
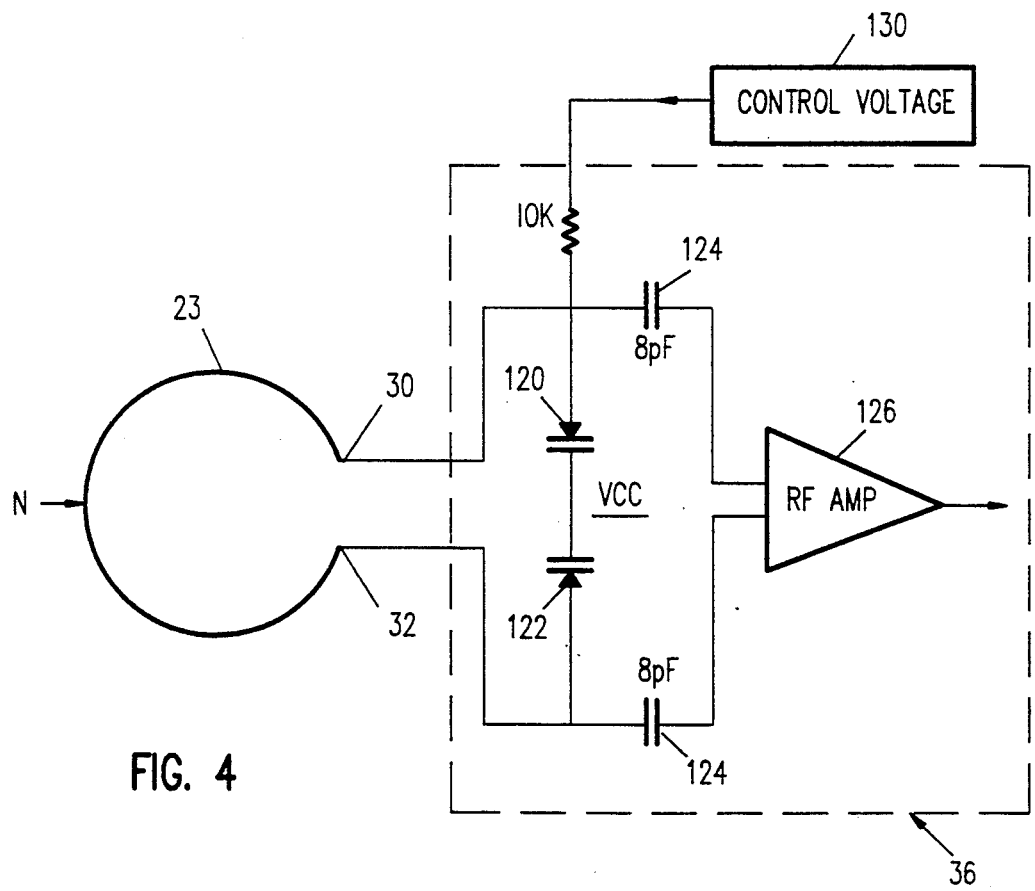
FIG. 4 is an enlarged depiction of a portion of the radio receiver of FIG. 3.

Referring to FIG. 4, part of the circuit depicted in block form in FIG. 3 is shown in greater detail. Antenna tuning circuit 36 includes a pair of varactor diodes 120, 122 connected across the antenna leads 30, 32. A capacitor 124 is located in each lead between the antenna input and an amplifier 126. A control voltage 130 is provided from antenna tuning control circuit 38 to adjust the tuning circuit to the proper RF frequency.

Returning now to FIGS. 1 and 2, antenna 23 forms a single turn loop antenna. In order to tune the antenna to the desired frequency, antenna tuning circuit 36 includes a capacitor (not shown) across the ends of antenna leads 30, 32. This makes the antenna-capacitor circuit behave as a parallel resonant tank circuit, i.e., an inductor and a capacitor connected in parallel. The impedance across such a tuned tank circuit is quite high, and is the impedance which receiver 34 uses.

An important characteristic of such a circuit is the presence of a null point at the middle of the loop, as indicated by the letter N in FIG. 3. So long as neither side of the antenna is grounded, for instance, to the watch case, null point N will remain at the midpoint of the loop. This feature of the circuit allows the placement of a conductive, generally metallic, buckle at the null point, which buckle may be in physical and electrical contact with the wearer without detuning the antenna.

Referring initially to FIGS. 1 and 2, one form of the buckle of the invention is depicted generally at 46. Buckle 46 includes a first clasping portion shown generally at 48 which is fixed to second end 16b of wrist strap 16 at a predetermined distance from case 12, which positions buckle 46 substantially at null point N of antenna 23. In this embodiment, clasping portion 48 includes a block 50 which is secured to a first buckle portion 52. Strap 16 and antenna element 20 are provided with one or more bores or ports therethrough, which receive one or more screws 54, thereby fixing first buckle portion 52 to wrist strap 16. Screw 54 provides both a physical and electrical connection between strap 16, antenna element 20 and first buckle portion 52. Buckle portion 52 includes a pair of hooks 54, 56 which secure first buckle portion 52 to a second buckle portion 58.

Second buckle portion 56 is adjustable along the second end 18b of wrist strap 18. Second buckle portion 58 includes a second clasping portion 59 which has a base 60, side plates 62, 64 extending, as the buckle is on the wearer's wrist, outward therefrom on either edge of the base plate, and arranged in a parallel, spaced apart relationship. Each side plate includes an opening 66 therein which receives a tab 68, which in turn extends from either side of a floating pressure plate 70. A locking lever 72 is carried on a locking lever pin 74 and acts on floating pressure plate 70 to retain wrist strap second end 18b securely between base plate 60 and floating pressure plate 70. Base plate 60 has clasping means, in the form of raised areas 76, 78 which are conformal with wasted areas, or ports, 80 formed in the inner surface 18d of wrist strap 18. This arrangement provides for electrical and physical connection between second buckle portion 58 and antenna element 22.

Second buckle portion 58 may be moved along the length of wrist strap second end 18b by releasing locking lever 72 and sliding second buckle portion 58 along the length of the wrist strap. Raised area 76, 78 may be placed in any of ports 80 along the end of the wrist strap to make contact with antenna element 22, thereby adjusting the length of the wrist strap.

To secure watch 10 to the wearer's wrist, hooks 54, 56 are secured on transverse pins 82, 84, respectively, in the manner depicted in FIG. 2, thereby securing the first buckle portion to the second buckle portion, and providing a completed loop antenna having a conductive buckle at a null point thereon.

Figure 5:
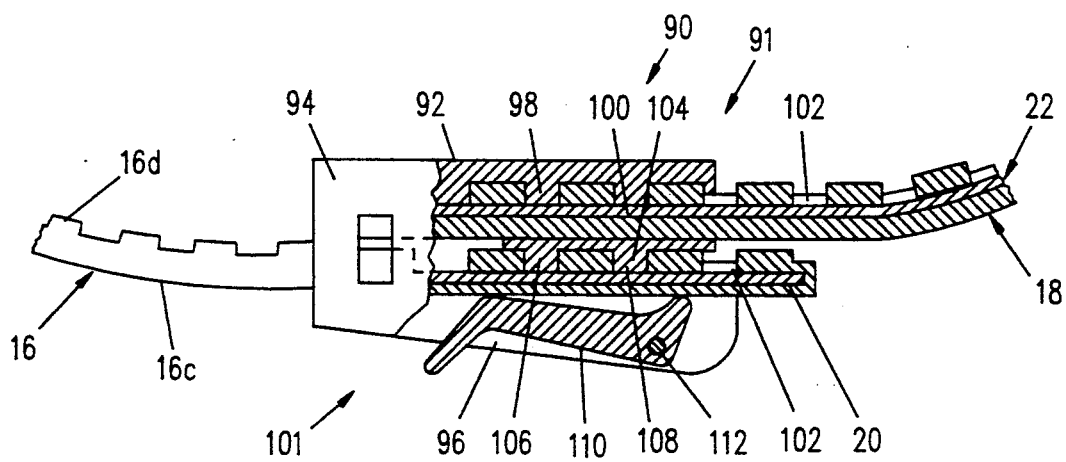
FIG. 5 is a side elevation of a modified buckle of the invention, with portions broken away to show detail.

In some instances, the wearer may need to move second buckle portion to an extreme position on the wrist strap, thereby shifting buckle 46 out of null point N. To this end, and now referring to FIG. 5, a buckle 90 may be provided which allows for movement of the buckle along both wrist straps. Buckle 90 has a first grasping portion 91 which includes a base plate 92 having sides 94, 96 extending upward and outwardly therefrom, in relation to the wearer's wrist, on either edge of the base plate, in a spaced apart relationship. Base plate 92 includes raised areas 98, 100 which are received in ports, such as port 102 of wrist strap 18. This arrangement places raised area 98, 100 in electrical contact with antenna element 22, which is located in wrist strap 18. A floating pressure plate 104 applies pressure to strap 18 to maintain antenna element 22 in physical and electrical contact with raised areas 98, 100 on base plate 92 when buckle 90 is closed.

Buckle 90 also has a second clasping portion including floating pressure plate 104, which, in this embodiment, also includes raised areas 106, 108 thereon. Raised areas 106, 108 are conformally received in ports 102 in wrist band 16, thereby bringing the raised area on the floating pressure plate into physical and electrical contact with antenna element 20. Electrical contact between antenna elements 20 and 22 is accomplished through the connection of floating pressure plate 104 with sides 94, 96, and subsequently base plate 92.

Wrist strap 16 is held in physical and electrical contact with floating pressure plate 104 by means of an arm 110 which is an over-center locking device, and which is carried on a pin 112 which extends between sides 94 and 96.

Buckle 90 may therefore be properly adjusted to that it is located at a predetermined location relative to straps 16 and 18, such that the effective length of antenna elements 20 and 22 are substantially equal, thereby placing buckle 90 at the null point of antenna 23. The buckle is closed by placing arm 110 in its over center, closed position, wherein the straps and their enclosed antenna elements are operable to maintain the radio receiver on the wearer's wrist and to provide a proper antenna for the radio receiver.

Although a preferred embodiment of the invention, and an alternate form thereof, have been disclosed herein, it should be appreciated that further variations and modifications may be made thereto without departing from the scope of the invention as defined in the appended claims.

What we claim is:

1. A wrist-mounted radio receiver system for wearing on a wrist comprising:
   a case for the radio receiver;
   two wrist straps extending from opposite sides of said case, each of said straps having a first end and a second end;
   a metal antenna element located inside each of said straps, said antenna element being insulated from the wrist of the wearer, each of said antenna elements having a first end and a second end;
   attachment means for physically attaching said first end of each of said straps to said case;
   connection means for electrically connecting said first end of each of said antenna elements to the radio receiver to form a balanced, differential input to the radio receiver;
   a non-insulated buckle physically and electrically connecting together the second ends of said straps and connecting together the second ends of said antenna elements so as to form a loop antenna for the radio receiver;
   whereby said loop antenna has a null region located coincident with said buckle such that touching the buckle does not detune said loop antenna.

2. The system of claim 1 where said wrist straps are constructed of an electrically insulating material which is formed about said metal antenna element, such that each strap has an outer surface, which faces away from the wrist of the wearer, and an inner surface, which is in contact with the wrist of the wearer.

3. The system of claim 2 wherein said buckle includes a first clasping portion and said inner surface of at least one of said straps includes a port therein which receives said first clasping portion of said buckle, and which permits physical and electrical contact between said clasping portion and said antenna element.

4. The system of claim 3 wherein said buckle includes means for fixing said buckle on one of said straps at a predetermined distance from said case.

5. The system of claim 3 wherein said buckle includes means for movably securing said buckle adjacent to said second end of one of said straps.

6. The system of claim 5 wherein said buckle includes a second clasping portion which is electrically and physically connected to the other strap second end and to the antenna element second end carried therein.

7. A wrist-mounted radio receiver system for wearing on a wrist comprising:
   a case for the radio receiver;
   two electrically non-conductive wrist straps extending from opposite sides of said case, each of said straps having a first end, which is physically attached to said case, and a second end, each strap further having an inner surface which contacts the wrist of the wearer and an outer surface which faces away from the wrist of the wearer;
   two metal antenna elements substantially enclosed in said non-conductive wrist straps, one of said metal antenna elements being substantially enclosed in each of said straps, said antenna elements being insulated from the wrist of the wearer, each of said antenna elements having a first end and a second end;
   connection means for electrically connecting said first end of each of said antenna elements to the radio receiver to form a differential input to the radio receiver;
   a non-insulated buckle which includes a first clasping portion for providing physical and electrical contact with said antenna element in one of said straps and a second clasping portion for providing physical and electrical contact with the other of said straps so as to form a loop antenna for the radio receiver;
   whereby said loop antenna has a null region located coincident with said buckle such that touching the buckle does not detune said loop antenna.

8. The system of claim 7 wherein said antenna elements are first and second antenna elements, and wherein said first clasping portion is permanently fixed to said first antenna element at a predetermined distance from said case.

9. The system of claim 8 wherein said strap associated with said second antenna element includes at least one port therein for receiving said second clasping portion therethrough.

10. The system of claim 7 wherein said inner surfaces of said straps includes wasted areas therein which receive said buckle.

11. The system of claim 10 wherein said first clasping portion includes clasping means which are conformal with said wasted areas and are receivable therein for holding said buckle on at a predetermined location.

12. The system of claim 10 wherein said second clasping portion includes clasping means which are conformal with said wasted areas and are receivable therein for holding said buckle on the other of said straps at a predetermined location.

13. A wrist-mounted radio receiver system for wearing on a wrist comprising:
   a case for the radio receiver;
   a wrist band for securing said case to a wearer's wrist, said wrist band including:
   two wrist straps extending from opposite sides of said case, each of said straps having a first end and a second end and inner and outer surfaces;
   a metal antenna element located inside each of said straps, said antenna element being insulated from the wrist of the wearer, each of said antenna elements having a first end and a second end; and
   a non-insulated buckle which includes a first clasping portion for providing physical and electrical contact with said antenna element in one of said straps and a second clasping portion for providing physical and electrical contact with the other of said straps so as to form a loop antenna for the radio receiver;
   whereby said loop antenna has a null region located coincident with said buckle such that touching the buckle does not detune said loop antenna;
   attachment means for physically attaching said first end of each of said straps to said case; and
   connection means for electrically connecting said first end of each of said antenna elements to the radio receiver to form a differential input to the radio receiver.

14. The system of claim 13 wherein said first clasping portion is permanently fixed to the antenna element located in one of said straps at predetermined distance from said case.

15. The system of claim 14 wherein the strap associated with the other antenna element includes at least one port therein for receiving said second clasping portion therethrough.

16. The system of claim 13 wherein said inner surfaces of said straps include wasted areas therein which receive said buckle.

17. The system of claim 16 wherein said first clasping portion includes clasping means which are conformal with said wasted areas and are receivable therein for holding said buckle on one of said straps at a predetermined location.

18. The system of claim 16 wherein said second clasping portion includes clasping means which are conformal with said wasted areas and are receivable therein for holding said buckle on the other of said straps at a predetermined location.

* * * * *